A. HELDRICH.
SHOCK ABSORBER.
APPLICATION FILED MAY 15, 1918.
1,304,311.
Patented May 20, 1919.
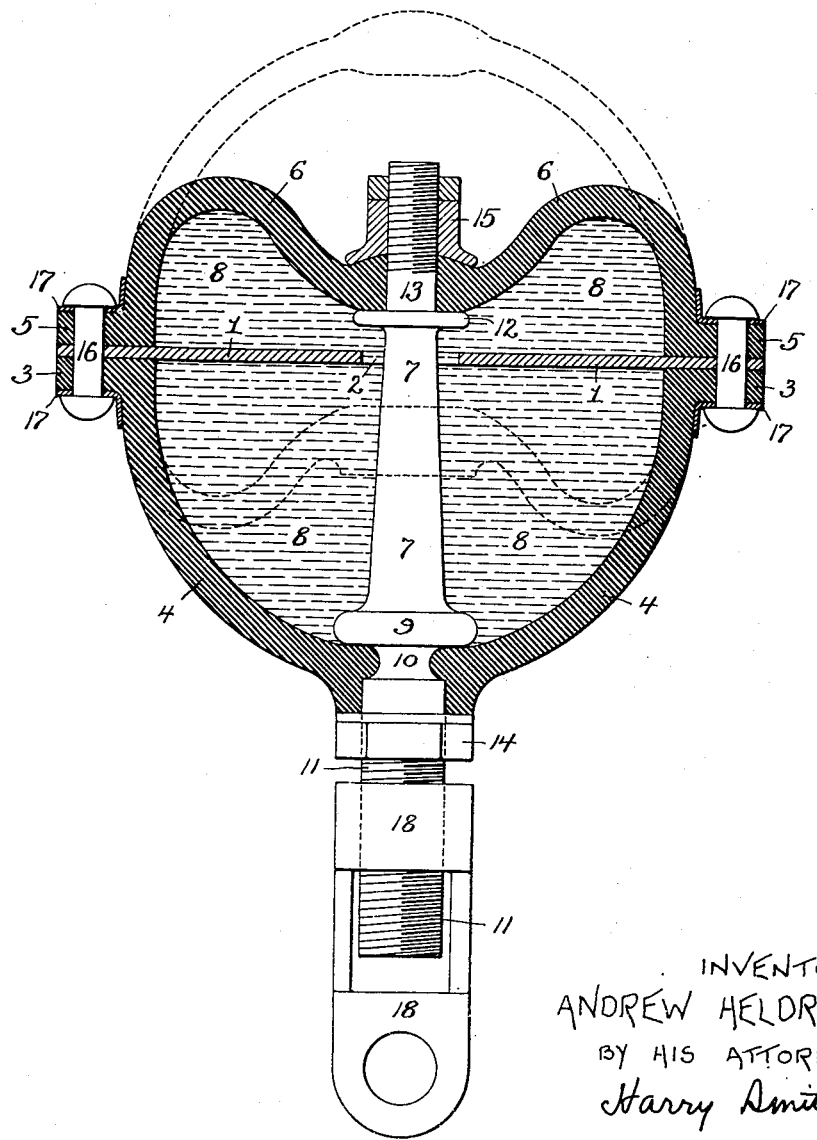
INVENTOR
ANDREW HELDRICH
BY HIS ATTORNEY
Harry Smith

UNITED STATES PATENT OFFICE.

ANDREW HELDRICH, OF PHILADELPHIA, PENNSYLVANIA.

SHOCK-ABSORBER.

1,304,311.      Specification of Letters Patent.      Patented May 20, 1919.

Application filed May 15, 1918. Serial No. 234,637.

*To all whom it may concern:*

Be it known that I, ANDREW HELDRICH, a citizen of the United States, residing in Philadelphia, Pennsylvania, have invented certain Improvements in Shock-Absorbers, of which the following is a specification.

My invention relates to that class of shock absorbers intended especially for use in motor cars and like vehicles and in which the shock is transmitted from the axle or other shock receiving member of the car to the body of other shock resisting member through the medium of a yielding body of oil or other fluid, the object of my invention being to provide such a shock absorber which will be cheap and simple in construction, silent in operation, and free from the liability to leakage to which shock absorbers of the cylinder and piston type are invariably subject.

This object I attain in the manner hereinafter set forth, reference being had to the accompanying drawing, which represents, in vertical section, a shock absorber constructed in accordance with my invention.

The shock absorber shown in the drawing comprises a central diaphragm 1 of steel or other rigid material having a central opening 2 of contracted area, and having secured to it, around its edge portion, the flange 3 of a lower flexible diaphragm 4 and the flange 5 of an upper flexible diaphragm 6, these diaphragms being preferably composed of rubber or other elastic material.

Between the diaphragms 4 and 6 is interposed a central post 7 which passes through the central opening 2 of the diaphragm 1 and increases in diameter from top to bottom so that, as it rises through the opening 2, the passage through the same will be gradually decreased in area. Between the upper and lower diaphragms is interposed a body of oil or other fluid 8, preferably under pressure.

The lower portion of the post 7 has formed upon it a collar 9 and undercut head 10, and, below the latter, a threaded stem 11, and the upper portion of said post has formed upon it a collar 12 and a threaded stem 13, the central portion of the lower diaphragm 4 being pressed against the collar 9 and forced into the undercut head 10 by means of a nut 14 upon the threaded stem 11, and the central portion of the upper diaphragm 6 being confined to the collar 12 by means of a nut 15 upon the threaded stem 13.

The flanges 3 and 5 of the diaphragms are secured to the outer portion of the diaphragm 1 by means of any desired number of bolts 16 either headed at both ends, as shown in the drawing, or threaded at one or both ends for the reception of nuts, ring washers 17 being interposed between the flanges 3 and 5 and the bolt heads or nuts for the purpose of applying pressure to all parts of said flanges.

Adapted to the threaded stem 11 at the lower end of the post 7 is an adjustable head 18 whose lower end is secured in any desirable manner to the axle or other member of the car which receives the shock, the flange 5, or some other part of the upper diaphragm 6, bearing upon, or being secured to, that portion of the car which receives the shock. When, therefore, the head 18 is subjected to shock tending to force the same upwardly the post 7 rises and the lower diaphragm 4 is deflected, as shown by dotted lines in the drawing, thereby forcing through the opening 2 in the diaphragm 1 the fluid confined between the diaphragms 1 and 4 and causing a corresponding rise in the upper diaphragm 6, the shock being transmitted to the resisting member of the car through the medium of this yielding body of fluid and the diaphragm 1.

When the shock is relieved the diaphragm 4 tends to return to its normal position, thereby drawing the fluid back again from the chamber above the diaphragm 1 to that below the same, this flow being assisted by the depression of the upper diaphragm through the medium of the post 7. The resistance to the flow of fluid from the chamber below the diaphragm 1 to that above the same is gradually increased because of the gradually decreasing area of the opening 2 as the tapering post 7 is forced upwardly through the same, so that, while the resistance to shock is always a yielding resistance, such resistance gradually increases in force from beginning to end.

While I prefer, in all cases, to employ in the rigid diaphragm 1 a central opening for the reception of the post 7, and the passage of fluid from the lower to the upper chamber, it will be evident that one or more openings of contracted area in other parts of said diaphragm 1 might be employed in place of, or in addition to, the central opening 12, and while I always prefer to use both upper and lower diaphragms, the upper diaphragm might, in some cases, be replaced by an open receiving vessel, or by a hermetically sealed receiving vessel if the fluid 8 was under pressure.

I claim:

1. A shock absorber in which are combined a rigid diaphragm having therethrough a passage of contracted area, a flexible diaphragm below said rigid diaphragm, said flexible diaphragm having a peripheral flange bolted to the peripheral portion of the fixed diaphragm, means for imparting shock to the central portion of said flexible diaphragm, and a body of fluid contained between said fixed and flexible diaphragms.

2. A shock absorber in which are combined a rigid diaphragm having therethrough a passage of contracted area, a flexible diaphragm below said rigid diaphragm, a body of fluid contained between said diaphragms, and a tapering post carried by said flexible diaphragm and entering the passage in the rigid diaphragm, so as to gradually reduce the area of the latter as the flexible diaphragm is deflected.

3. A shock absorber in which are combined a rigid diaphragm having therethrough a passage of contracted area, flexible diaphragms both above and below said rigid diaphragm, a body of fluid contained between said flexible diaphragms, and a connecting post extending from one of said flexible diaphragms to the other and serving to unite the two for joint movement.

4. A shock absorber in which are combined a rigid diaphragm having therethrough a passage of contracted area, a flexible diaphragm below said rigid diaphragm, a fluid body contained between said diaphragms, a post having thereon a collar and an undercut head below the same, and means for confining said flexible diaphragm to said collar and forcing it into said undercut head.

5. A shock absorber in which are combined a rigid diaphragm having therethrough a passage of contractaed area, a flexible diaphragm below said rigid diaphragm, a fluid body between said diaphragms, and a head adjustable toward and from said flexible diaphragm and serving to connect the latter to the member upon which shock is exerted.

6. A shock absorber in which are combined a rigid diaphragm having therethrough a passage of contracted area, flexible diaphragms above and below said rigid diaphragm, a fluid body between said flexible diaphragms, a post connecting said flexible diaphragms and threaded at each end, collars on said post serving as seats for the diaphragms, and nuts on the threaded portions of the post for confining the diaphragms to said collars.

7. A shock absorber in which are combined a rigid diaphragm having therethrough a passage of contracted area, a flexible diaphragm below said rigid diaphragm, a post having thereon a collar serving as a seat for said diaphragm, and a threaded stem beyond said collar, a nut on said threaded stem for securing the diaphragm to said collar, and an adjustable head on said stem for connection with the member upon which shock is exerted.

In testimony whereof I have signed my name to this specification.

ANDREW HELDRICH.